June 22, 1965 G. BATORI 3,190,336

TRACTION DEVICE FOR VEHICLES

Filed April 11, 1963 2 Sheets-Sheet 1

INVENTOR

George Batori

June 22, 1965  G. BATORI  3,190,336
TRACTION DEVICE FOR VEHICLES
Filed April 11, 1963  2 Sheets-Sheet 2

INVENTOR
George Batori 3,190,336
TRACTION DEVICE FOR VEHICLES
George Batori, 63 Oakwood Ave., Hamburg, N.Y.
Filed Apr. 11, 1963, Ser. No. 272,491
4 Claims. (Cl. 152—227)

This invention relates to a modified traction grip device which is similar to my previous traction device disclosed in Patent No. 3,028,901, April 10, 1962.

The principal object of this invention is to achieve, by inserts which are built into the original device, a much higher traction capacity.

Further improvement of the invention is:

Steel and rubber combination cleats adapted on the non-skid element which prevent the wear of the steel parts.

Figure 1:
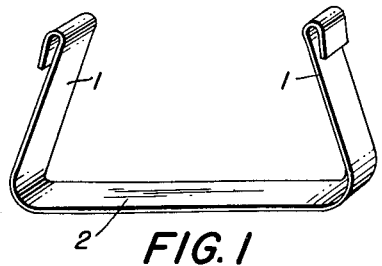
Figure 2:
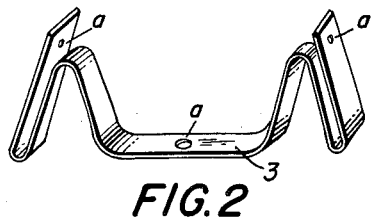
Figure 3:
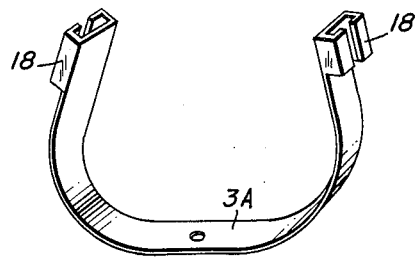
Figure 4:
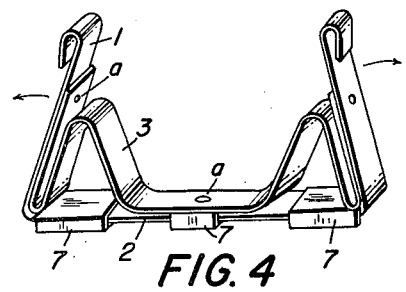
Figure 5:
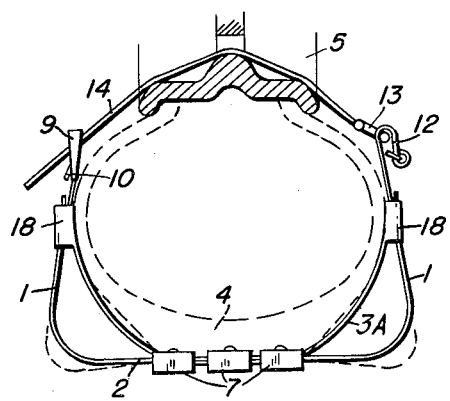
Figure 6:
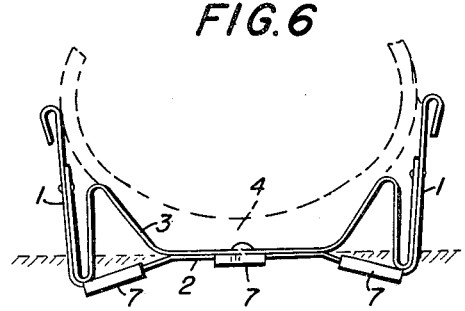
Figure 8:
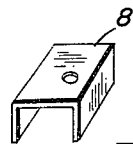
Figure 7:
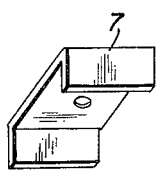

FIGURE 1 is a perspective view of the traction member. FIGURES 2 and 3 each show a perspective view of different inserts. FIGURE 4 is a perspective view of the assembly of the insert with the traction element. FIGURE 5 is a sectional view of the insert of FIGURE 3 as a mud grip type assembly; the dotted lines indicate soft ground position. FIGURE 6 shows a view of FIGURE 4 on soft ground. FIGURES 7 and 8 show in detail the traction cleats in perspective view, and FIGURE 9, in assembled position.

Figure 10:
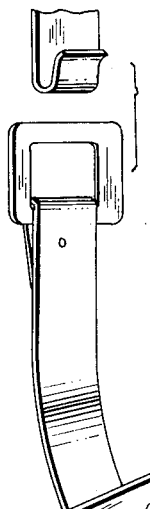
Figure 10:
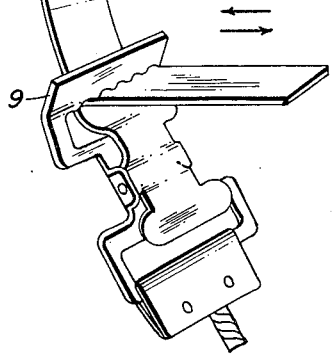

FIGURE 10 shows a coupling device of side members.

Referring to the figures, the nomenclature is: resilient side part of traction element 1, anti-skid part of the traction element or grip 2, triangle shaped insert 3, circular shaped insert 3A, tire 4, wheel rim 5, rubber 6, square plate for outer cleat 7, inner cleat 8, and clamp 9.

Testing and experimenting with the original device, I have found that the capacity of the anti-skid elements, by a simple insert, can be greatly improved. This insert is a resilient steel strip, which is bent into an open triangle form on its two ends. The remaining third side of the triangle bent back, parallel to the side of the triangle, FIGURE 2. This insert with three points, in FIGURE 2, "a" is fixed into the anti-skid element shown in FIGURE 1, without restricting the free moving capacity of the sides of the traction element which can move in the direction indicated by arrows in FIGURE 4. By this configuration, it is possible that on soft ground the two triangles, from the effect of a regular tire pushing the two ends of the anti-skid parts deeper into the ground, will secure a greater traction capacity than the middle part. As a known fact, the displacement of the tire is always greater where it touches the ground and just this normal displacement increases the push of the two triangles into the soft ground as shown on FIGURE 6.

The other insert which is shown on FIGURE 3 is a one-piece horseshoe-shaped strip with clamps on each end. In these clamps, the side of the anti-skid part as shown in FIGURE 5 could move freely in a longitudinal but not in a lateral direction. The middle part of this insert is also fixed permanently to the middle part of the non-skid element. Both insert type traction elements can be used as either a separate mud grip or with side members and plurality of grips forming a complete traction device. The horseshoe type insert, for example, is shown in FIGURE 5 as a mud grip type traction element. The element is fixed on the tire by the insert, but the two sides of traction element 1 could move the clamps 9 of the insert in a longitudinal direction. Therefore, the traction element can keep its resiliency in any condition and always keep the insert tight on the tire, which is important for future installation of the device.

Figure 9:
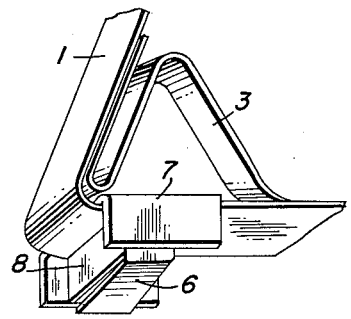

The traction capacity could be raised by adapting special shaped cleats on the device, FIGURES 7, 8 and 9. These cleats, 7 and 8, could be a combination of rubber and steel or only steel. The rubber parts prevent the quick wearing of the steel parts and reduce the noise. To insure against the great force which occurs from the wheel spinning, the outer cleats 7, FIGURE 4, are placed between the insert 3 and the non-skid element 2 by using the triangle type insert and between the tire and insert FIGURE 5, by using the horseshoe shaped insert. The cleats have a rectangular shaped form which, on its two opposite ends, is bent, perpendicular, FIGURES 7 and 8.

The part 7 is placed above the insert or above the non-skid element. FIGURE 9, a similar part 8 placed at a 90° off set position is connected from below the non-skid element side into the bent over side of the first part 7 and riveted together. In the sides of the two parts a cavity is created which is filled by a wear resistant rubber part 6 which could stand out higher than the sides of the steel parts.

I claim:

1. A traction device for tires having a U-shaped traction member, said traction device comprising an inside insert comprising a symmetrically shaped resilient steel strip straight in its middle part and on its two ends formed into inverted V-shaped parts, the continuation of the said V-shaped parts bent backwards, parallel to the legs of the V, these backward bent parts fixed to the sides of the traction member and the straight part of the insert connected to the middle part of the traction member, the sides of the traction member being free to flex in a transverse direction, a plurality of these traction members and inserts adapted to be mounted on the periphery of a tire with the sides in radially inward position secured on both sides of the tire by side members.

2. A traction device for tires having a U-shaped traction member, said traction device comprising a horseshoe shaped resilient steel strip insert fitted therein and having clamp means on each end, the insert, by said clamp means, having a slidable connection with the sides of the traction member, the middle part of the horseshoe shaped insert being fixed permanently to the base of the traction member, the traction device adapted to be attached to a tire with its sides extending radially inwardly and secured by a strap extending through a wheel slot and attached to the two sides of the traction member.

3. The traction device of claim 1 wherein the traction member is secured by a strap connected through a slat in the wheel and secured to the two sides of the traction member.

4. A traction grip cleat for use with a traction member, said cleat comprising a pair of rectangular shaped steel plates two sides of each plate being bent perpendicular to the central portion of the plate, said plates being assembled with the flanges defining a cavity and resilient, high wear capacity rubber insert filling the cavity and extending outwardly of the flanges whereby when mounted on the traction member the traction grip cleat will prevent fast wearing of the traction member.

References Cited by the Examiner
UNITED STATES PATENTS
1,540,067    6/25    Grimord et al. _____ 152—225
3,028,901    4/62    Batori _____ 152—239

ARTHUR L. LA POINT, *Primary Examiner.*